US00RE42769E

(19) United States
(12) Reissued Patent
Kroeger et al.

(10) Patent Number: US RE42,769 E
(45) Date of Reissued Patent: Oct. 4, 2011

(54) GUITAR BODY REINFORCEMENT

(75) Inventors: Kevin M. Kroeger, Corona, CA (US); Meaulnes Laberge, Graham, WA (US); Timothy P. Shaw, Madison, TN (US); Daniel J. Smith, Corona, CA (US); Donald Scott Wade, Jr., Tempe, AZ (US)

(73) Assignee: Fender Musical Instruments Corporation, Scottsdale, AZ (US)

(21) Appl. No.: 12/893,803

(22) Filed: Sep. 29, 2010

Related U.S. Patent Documents

Reissue of:
(64) Patent No.: 7,678,978
Issued: Mar. 16, 2010
Appl. No.: 12/210,637
Filed: Sep. 15, 2008

U.S. Applications:
(63) Continuation of application No. 11/446,076, filed on Jun. 1, 2006, now Pat. No. 7,439,427.

(51) Int. Cl.
*G10D 3/00* (2006.01)

(52) U.S. Cl. ..... 84/291; 84/173; 84/267; 84/290; 84/327

(58) Field of Classification Search ..... 84/291, 84/290, 280, 281, 173, 267–269, 274–277, 84/327
See application file for complete search history.

(56) References Cited

U.S. PATENT DOCUMENTS

| | | | | |
|---|---|---|---|---|
| 3,656,395 | A | 4/1972 | Kaman | |
| 3,974,730 | A | 8/1976 | Adams, Jr. | |
| 4,084,475 | A | 4/1978 | Horowitz | |
| 4,213,370 | A | 7/1980 | Jones | |
| 4,429,608 | A | 2/1984 | Kaman et al. | |
| 4,741,238 | A | 5/1988 | Carriveau | |
| 5,333,527 | A | 8/1994 | Janes et al. | |
| 5,461,958 | A | 10/1995 | Dresdner et al. | |
| 5,469,770 | A | 11/1995 | Taylor | |
| 5,661,252 | A | 8/1997 | Krawczak | |
| 5,804,746 | A | 9/1998 | Kersenbrock et al. | |
| 6,051,764 | A | 4/2000 | Sakurai | |
| 6,166,308 | A | 12/2000 | Lam | |
| 6,333,454 | B1 | 12/2001 | Griffiths | |
| 7,439,427 | B2 * | 10/2008 | Kroeger et al. | 84/291 |
| 2003/0154843 | A1 | 8/2003 | McPherson | |

FOREIGN PATENT DOCUMENTS

| | | |
|---|---|---|
| CN | 1622190 | 6/2005 |
| KR | 1020010029188 A | 4/2001 |

* cited by examiner

*Primary Examiner* — Jianchun Qin
(74) *Attorney, Agent, or Firm* — Robert D. Atkins; Patent Law Group

(57) ABSTRACT

A support for a body of a stringed instrument includes a brace structure having a plurality of legs radially disposed about a central body. The brace structure has a substantially flat first surface. A portion of the plurality of legs conforms to a soundhole opening which is integrated into the body of the stringed instrument. A brace for a body of a guitar includes a unitary structure adapted to mount to a soundboard of the guitar. The unitary structure has a plurality of arms radially disposed about a central body. A method of assembling a guitar includes mounting a brace structure to a soundboard of the guitar. Again, the brace structure has a plurality of legs radially disposed about a central body.

24 Claims, 4 Drawing Sheets

GUITAR BODY REINFORCEMENT

Matter enclosed in heavy brackets [ ] appears in the original patent but forms no part of this reissue specification; matter printed in italics indicates the additions made by reissue.

CLAIM OF DOMESTIC PRIORITY

The present application is a continuation and claims priority of U.S. application Ser. No. 11/446,076, filed Feb. Jun. 1, 2006 *now U.S. Pat. No. 7,439,427*.

FIELD OF THE INVENTION

The present invention relates in general to musical instruments and, more particularly, to a body reinforcement apparatus for stringed musical instruments.

BACKGROUND OF THE INVENTION

Guitars are popular musical instruments and are used commonly by both amateur and professional musicians. The acoustic guitar generally has a hollow body which is connected to a neck. The hollow body includes a backboard and a soundboard. Integrated into a central area of the soundboard is a soundhole. The backboard and soundboard are connected by a shaped sidewall. The neck and body are generally connected together using a structure commonly known as a headblock. The neck terminates at a joint where the neck and headblock come together in a neck-to-body joint.

Guitars have a series of strings strung at substantial tension from a bridge on the soundboard, across the soundhole, and along the neck. Guitars originally made use of low tension strings, first made of gut and later of nylon. Later, steel strings were incorporated into guitars. The use of steel strings dramatically increased the tensile forces, which act on the body and neck of the guitar.

Prior art designs have attempted to improve upon the strength and durability of guitars without adversely affecting playing qualities. Improvements have included bracing patterns on the underside of the soundboard, or neck-to-body joint configurations for strengthening the joint area of a guitar.

Notwithstanding the various improvements, the manufacture of guitars, particularly acoustic guitars which generally use wood materials in construction of the instrument, is subject to a great deal of variability in the completed product. The physical qualities of wood material can vary from piece to piece, and environmental factors such as humidity also play a role on the overall physical characteristics of the various subcomponents which are integrated into a manufactured guitar.

In addition, guitars continue to suffer from a lack of strength and rigidity in certain areas. The soundhole region of the body continues to be of concern. A lack of rigidity and support in certain areas of the guitar contributes to a lower overall integrity of the guitar as well as a decrease in playability and a noticeable change in the overall tone of the instrument.

Thus, a need exists for an apparatus, method of assembly, and method of manufacture of a guitar which increases the physical integrity of the instrument. In addition, a need exists for an apparatus to provide additional structural support and rigidity in the soundhole and body-to-neck regions of a guitar.

Finally, a need exists for an apparatus, which does not suffer from inherent variability in the physical characteristics of the apparatus.

SUMMARY OF THE INVENTION

In one embodiment, the present invention is a stringed musical instrument comprising a body having a soundboard with a soundhole formed through the soundboard. A headblock is mechanically coupled to the body. A brace structure is mounted to the soundboard. The brace structure has a plurality of legs extending radially from a central body. The legs and central body are a unitary structure and uniform in construction. The brace structure has substantially flat upper and lower surfaces. First and second legs of the brace structure conform to the soundhole, and third and fourth legs extend in opposite directions across the soundboard, and fifth and sixth legs radiate outward from the central body with increasing distance between the fifth and sixth legs. The central body has first and second notches disposed between the fifth and sixth legs for receiving the headblock.

In another embodiment, the present invention is a stringed musical instrument comprising a body having a soundboard with a soundhole formed through the soundboard. A headblock is mechanically coupled to the body. A support brace is mounted to the soundboard. The support brace has a plurality of legs extending radially from a central body. The legs and central body are a unitary structure. The support brace has substantially flat upper and lower surfaces. First and second legs of the support brace conform to the soundhole and the central body includes notches for receiving the headblock.

In yet another embodiment, the present invention is a stringed musical instrument comprising a body having a soundboard with a soundhole formed through the soundboard. A support brace is mounted to the soundboard. The support brace has a plurality of legs extending radially from a central body. The legs and central body are a unitary structure. The support brace has substantially flat upper and lower surfaces. First and second legs of the support brace conform to the soundhole.

In still another embodiment, the present invention is a method of manufacturing a guitar comprising the steps of providing a body having a soundboard with a soundhole formed through the soundboard, and mounting a support brace to the soundboard. The support brace has a plurality of legs extending radially from a central body. The legs and central body are a unitary structure. The support brace has substantially flat upper and lower surfaces. First and second legs of the support brace conform to the soundhole.

BRIEF DESCRIPTION OF THE DRAWINGS

FIG. 3b illustrates a second example brace support apparatus mounted to a soundboard in a reverse configuration than the configuration shown in FIG. 3a;

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

To provide structural support to the soundboard, and provide rigidity around the soundhole and fingerboard areas, a support brace apparatus can be employed which has a plurality of arms which are radially disposed from a central body of the brace. The brace structure can be unitary and uniform in construction, which is a departure from prior art designs which feature a series of individual braces in a lattice-type arrangement.

Figure 1:
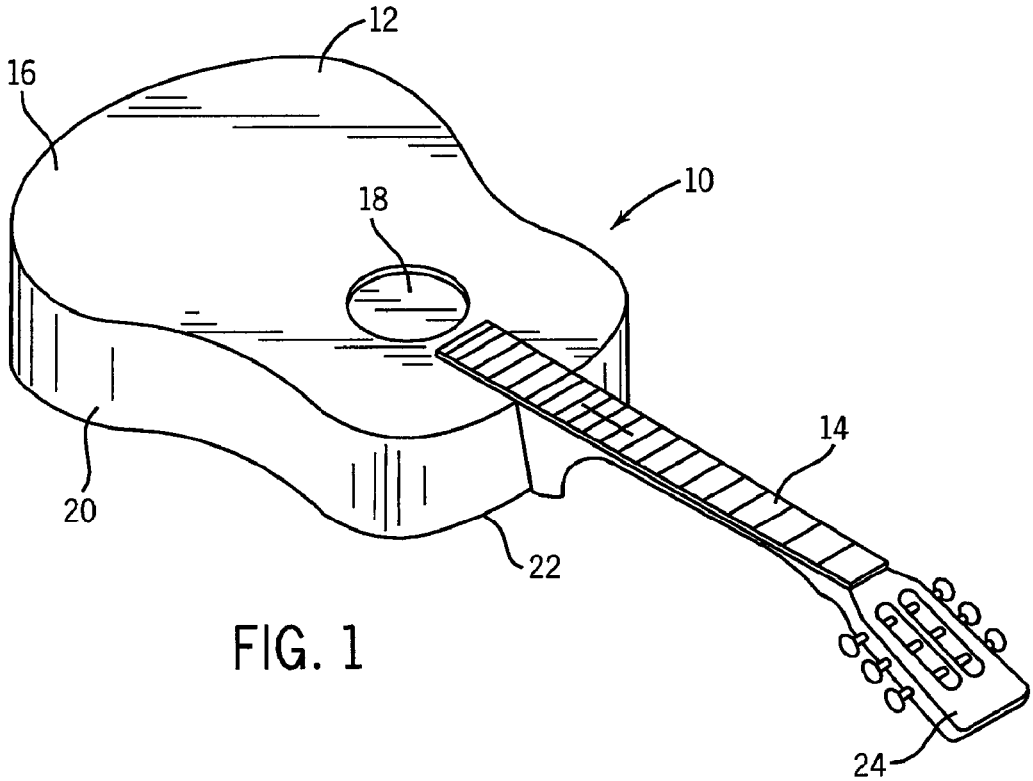
FIG. 1 illustrates a guitar having a neck and body including a soundboard with soundhole.

Turning to FIG. 1, a guitar 10 having a body 12 and a neck 14 is illustrated. The body 12 has a soundboard 16 with a circular soundhole 18. The soundboard 16 is connected to sidewall 20, which in turn, is connected to a backboard 22. The neck 14 has a headstock 24. Strings (not shown) are strung from headstock 24, along the neck 14, across the soundhole 18, and to a bridge (not shown) on the soundboard 16.

Figure 2:
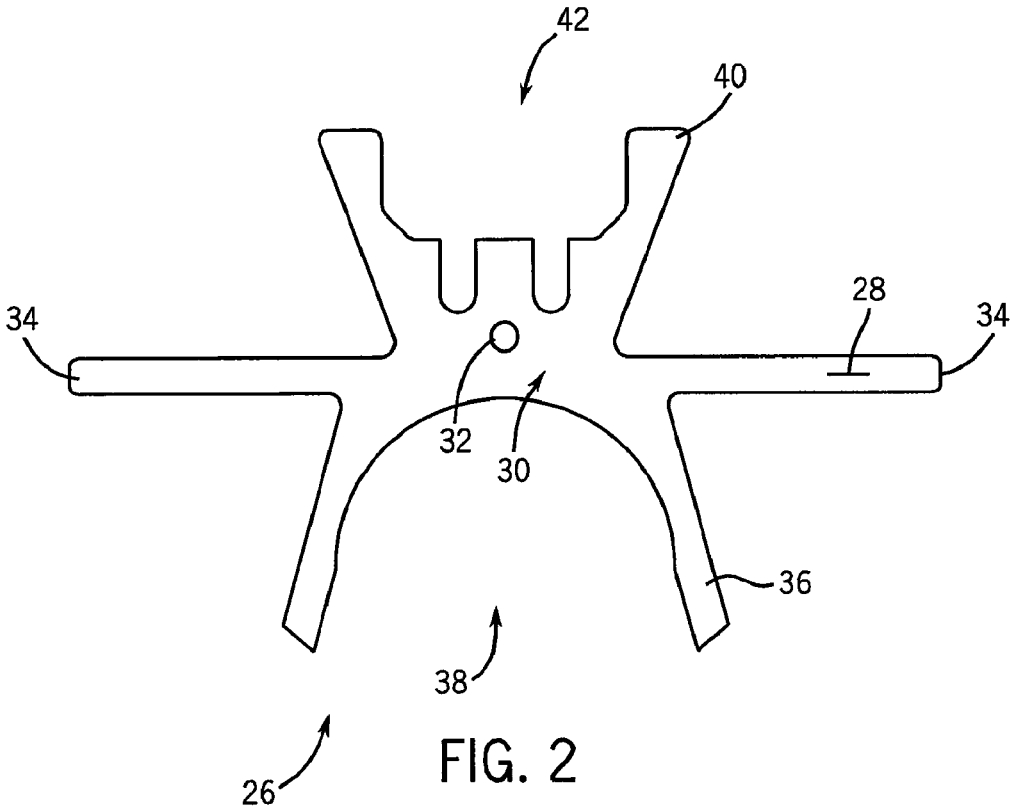
FIG. 2 illustrates an example brace support apparatus.

FIG. 2 depicts a support brace apparatus 26 as previously described as a unitary structure. Brace 26 has substantially flat top and bottom surfaces 28 in order to conform to a top interior surface of the body 12. Brace 26 includes a plurality of arms which are radially disposed about a central body 30. An aperture 32 or opening is disposed in the central region of body 30. Aperture 32 allows an attachment mechanism such as a screw or bolt to penetrate the body 30 to draw brace 26 securely to the top interior surface of the body 12 of guitar 10.

A portion of the plurality of arms is conformed to a soundhole opening 38. A first arm 36 is disposed symmetrically from a second arm 36, the two arms 36 conform to the soundhole opening 38. Similarly, a first arm 34 is disposed symmetrically to a second arm 34. In a mounted brace 26, arms 34 extend substantially across a top interior surface of the body 12 of a guitar 10. A first arm 40 is seen symmetrically disposed opposite a second arm 40, forming an opening 42. Opening 42 is intended to conform to a profile of a surface of a headblock, as will be further described.

Figure 3A:
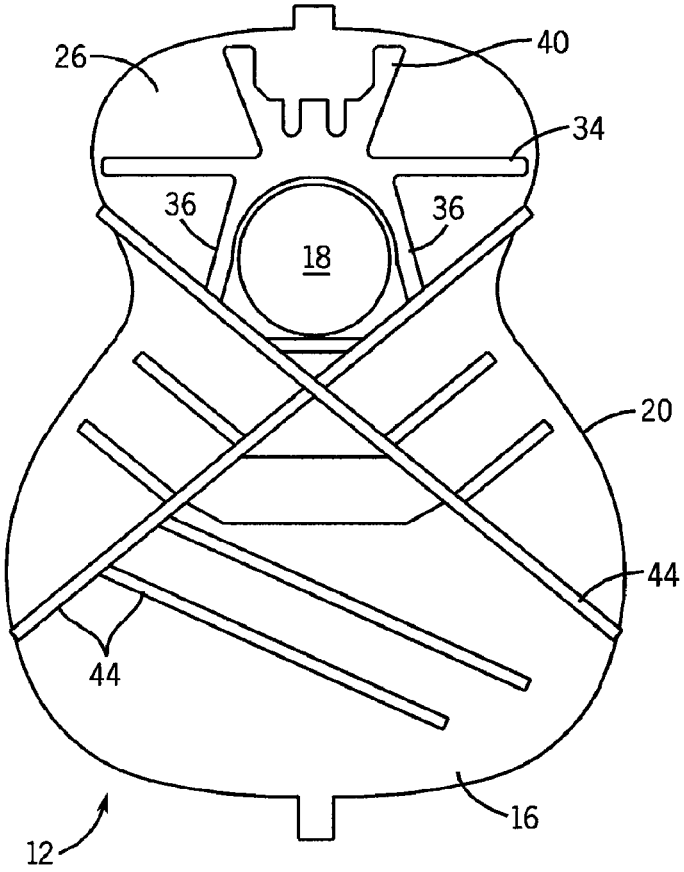
FIG. 3a illustrates an example brace support apparatus mounted to a soundboard and coupled to a prior-art "X" brace.

Turning to FIG. 3a, a view of the interior surface of soundboard 16 as part of body 12 is depicted. Brace 26 is mounted to the interior surface of body 12 (soundboard 16) as shown. Legs 36 are secured to the interior surface of soundboard 16, and may be additionally secured to a prior-art lattice structure of individual support braces 44. Legs 36 can be secured to braces 44 using a glue material or with an attachment mechanism such as a screw. Again, a portion of legs 36 are adapted to conform to a soundhole 18 opening in the body 12. Legs 34 extend laterally substantially across the soundboard 16 to provide structural support to the soundboard 16. Legs 40 extend towards the neck-to-body joint area and form an opening to receive a headblock.

Figure 3B:
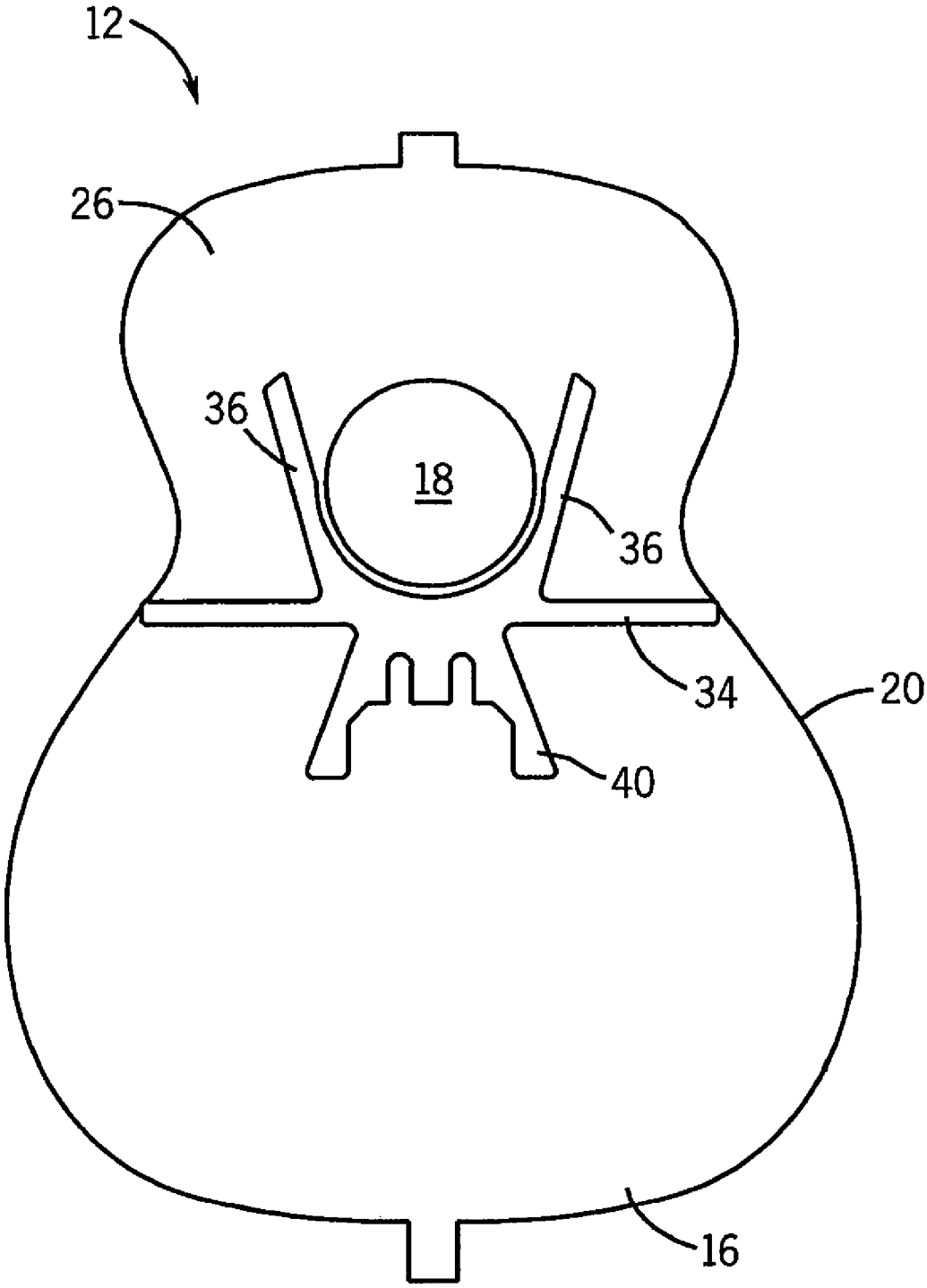

FIG. 3b depicts brace 26 in a second embodiment. Brace 26 is mounted in reverse fashion at a lower portion of soundboard 16 as depicted. A portion of legs 36 continues to conform to an area around the soundhole 18 to provide structural support and rigidity to the area around soundhole 18. The brace 26 is larger in size to accommodate the extra space of the lower portion of body 12 and soundboard 16 of guitar 10. Legs 34 are shown extending laterally across the soundboard 16 from a portion of the sidewall 20 to another portion of sidewall 20 positioned directly opposite. Two braces 26 can be used which are configured to mount to the soundboard 16. The first brace 26 can be mounted in a configuration similar to FIG. 3a. The second brace 26 can be mounted in reverse in a configuration similar to FIG. 3b. The second brace 26 can be designed and configured to replace a traditional prior art "X" brace which is commonly located in the lower portion of body 12. The configuration of legs 34 can provide consistent lateral support across body 12 and throughout the soundhole 18 region in a fashion that an X brace cannot.

In addition to the configurations of brace 26 described above, brace 26 can be molded or formed for a specific application and can include additional legs 36 and legs 40 as necessary to provide the desired structural support and rigidity, which can take into account the location of the soundboard 16 in which the brace 26 is mounted. Even though additional legs 36 and legs 40 may be incorporated into the brace 26 structure to fulfill a particular need, brace 26 generally remains unitary in construction, with legs 36 and legs 40 radiating from a central body 30.

Brace 26, as shown, replaces an upper transverse brace under the end of a fingerboard. Brace 26 also replaces most of the bracing around the soundhole with a unitary structure. Brace 26 can be composed of a composite material such as a carbon fiber reinforced plastic (CFRP) material with fibers which are selected to be oriented in a particular fashion to provide for a precise degree of stiffness and rigidity. In addition, the selection of composite material can be such that the intended rigidity varies across a surface 28 of brace 26, so that a particular region of brace 26 is more rigid than another particular region of brace 26. As a result, extra rigidity and support can be provided in areas of brace 26 which take advantage of the extra rigidity and support, while not sacrificing the overall tonal quality of the guitar 10. The composite material making up brace 26 can be chopped and molded or can utilize laid-up fibers which are arranged in a particular orientation. A composite brace 26 can be manufactured using known techniques for forming composite materials.

Use of brace 26 serves to eliminate distortion around the soundhole 18 caused by fingerboard and headblock rotation. In addition, brace 26 stiffens an upper part of body 12 in a consistent and controlled manner, unlike natural spruce braces which vary in density and stiffness. Individual bracing found in traditional guitars also tends to vary in stiffness in areas where consistent stiffness is desired. Use of a unitary structure such as brace 26 serves to provide consistent rigidity in a manner, which can be reproduced efficiently in a manufacturing environment.

Figure 4:
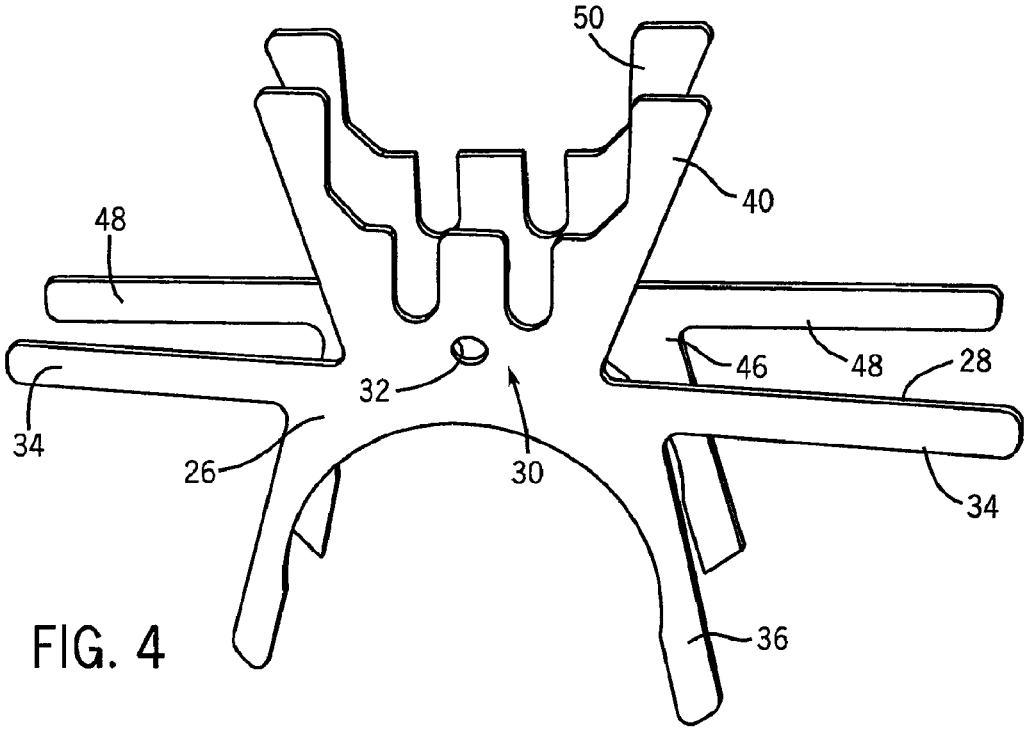
FIG. 4 illustrates a brace and an accompanying shim structure conforming to a profile of the brace.

Turning to FIG. 4, a brace 26 is seen in combination with a shim structure 46. Again, brace 26 has a substantially flat top and bottom surface 28 and includes central body 30, aperture 32, legs 34, 36 and 40. Shim structure 46 is intended to interface the brace 26 with the interior surface soundboard 16. In the illustration shown, shim 46 interfaces the top surface 28 of brace 26 with the corresponding interior vertical surface of soundboard 16. Shim 46 is intended to be a thin piece of material, generally composed of wood but able to be composed of other materials. As shown, shim 46 is shaped in the outline of brace 26. Arms 48 and 50 correspond respectively to arms 34 and 40.

The use of shim 46 allows the same brace 26 to be used in a variety of guitar manufacturing scenarios. A single brace 26 can be used in a variety of guitars 10 having differing interior surface features. As a result, the manufacturing process is made more efficient, but each brace 26 fits snugly and appropriately in a particular setting. Because shim 46 is composed of wood, shim 46 is easily sanded to a particular shape. Sanding a composite brace 26 would present a host of additional problems into the manufacturing process which the introduction of shim 46 eliminates. Nevertheless, brace 26 can be mounted to guitar 10 by sanding the composite material and using an epoxy, although sanding the composite material is not preferred.

Shim 46 can be bonded to brace 26 using an epoxy, strong glue or similar bonding material. However, because shim 46 is a wood material, the bonded shim 46/brace 26 combination can then be bonded to the interior surface of body 12 using a single water-based glue, as is now common in the manufacturing process. Thus, the final assembly process of guitar 10 can continue to proceed in a common fashion. Without the use of shim 46, an epoxy or other strong glue would have to be used at the same time as the typical wood-based bond process, which would complicate the overall manufacturing process.

Figure 5:
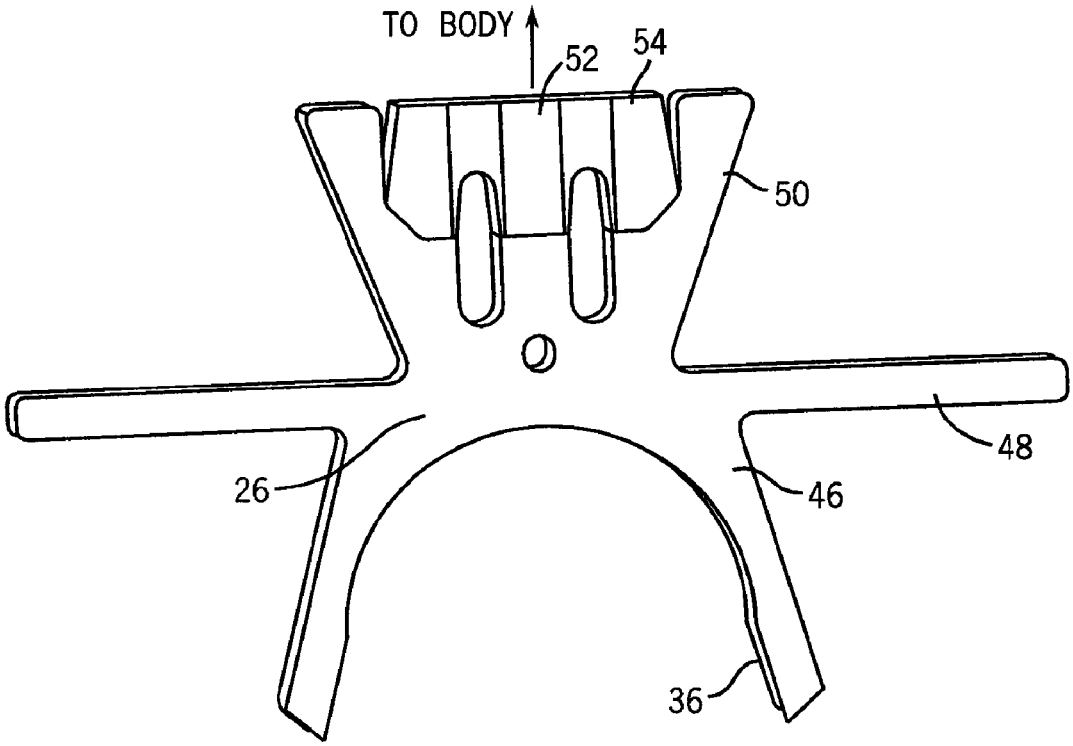
FIG. 5 illustrates a brace, a shim structure, and a headblock.

FIG. 5 illustrates a top view of brace 26 with an accompanying shim 46, the brace 26 and shim 46 coupled to a headblock 52 which is intended to mount to the interior of body 12 at the neck-to-body joint region. The back surface 54 of headblock 52 can engage the interior surface of body 12 or can engage a shim 46 which is formed to a profile of the headblock 52. Headblock 52 can work in conjunction with brace 26 to promote rigidity throughout the soundhole 18 and neck-to-body region. Headblock 52 and brace 26 can be made unitary in construction and make use of composite materials to promote consistency, rigidity, and ease of manufacture.

Figure 6:
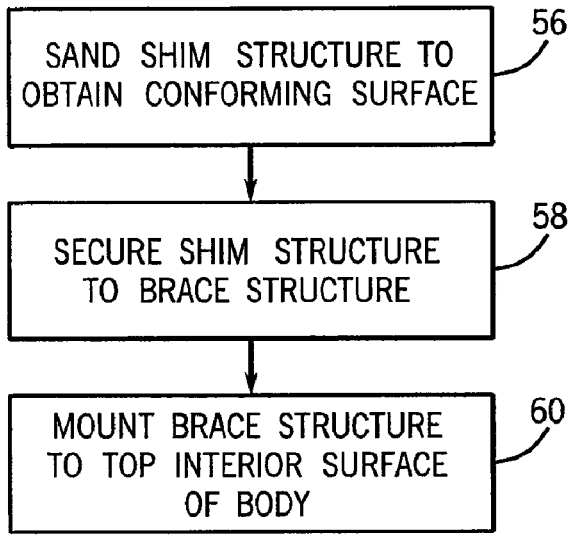
FIG. 6 illustrates an example method of assembling a guitar incorporating a brace as described.

Turning to FIG. 6, an example method of manufacture of a guitar 10 making use of a brace 26 as described is depicted. As a first, preassembly step, the shim structure can be sanded to obtain a conforming surface for a particular application to a soundboard 16 (step 56). The shim structure can then be affixed to a brace structure such as a typical "X" brace structure commonly found in guitars 10 (step 58). Finally, the assembled brace apparatus, including brace 26 and the prior art structure, can be mounted to a top interior surface of body 12 (step 60).

Use of a unitary brace 26 stiffens the soundboard 16 in ways which promote musically desirable frequencies. Additionally, use of brace 26 prevents or limits undesirable deformation of the soundboard 16 due to string tension. Brace 26, again, can be laid up of composite fibers which, unlike wood parts, are predictable and repeatable in strength and orientation. The composite fibers can be manufactured using commonly-known techniques to mold and form composite structures.

The geometry of brace 26 is designed to provide strength under the end of a fingerboard of guitar 10. However, the geometry of brace 26, in one embodiment, can also mimic the slight flexibility of smaller, prior-art braces, which are commonly located around the soundhole 18.

Again, the use of the brace 26 eliminates multiple braces, thus speeding up manufacture by eliminating individual components and providing for a simpler manufacturing process.

In addition to providing stiffness and rigidity to the soundboard 16, an embodiment of brace 26 may be used to transmit part of a compression load from the neck 14 into the sides of the traditional guitar "X" brace. By transmitting the compression load, distortion of the soundboard 16 is reduced in the upper bout and around the soundhole 18. The embodiment differs from mimicking the slight flexibility of smaller prior-art braces by including stiffening members around soundhole 18, again in a desired configuration to provide the required rigidity at a specific location.

Use of brace 26 stiffens the soundboard 16, where necessary, in a controlled, repeatable manner. Stiffening soundboard 16 as necessary allows the remainder of the soundboard 16 to vibrate more freely, improving tone and sustain. Brace 26 adds controlled rigidity to the area immediately surrounding the soundhole 18, again eliminating distortion caused by movement in the soundhole region.

While one or more embodiments of the present invention have been illustrated in detail, the skilled artisan will appreciate that modifications and adaptations to those embodiments may be made without departing from the scope of the present invention as set forth in the following claims.

What is claimed:

1. A stringed musical instrument, comprising:

a body having a soundboard with a soundhole formed through the soundboard;

a headblock mechanically coupled to the body; and a brace structure mounted to the soundboard, the brace structure having a plurality of legs extending radially from a central body, the legs and central body being a unitary structure and uniform in construction, the brace structure having substantially flat upper and lower surfaces, wherein first and second legs conform to the soundhole and third and fourth legs extend in opposite directions across the soundboard and fifth and sixth legs radiate outward from the central body with increasing distance between the fifth and sixth legs, the central body having first and second notches disposed between the fifth and sixth legs for receiving the headblock.

2. The stringed musical instrument of claim 1, wherein the brace structure is made of composite material.

3. The stringed musical instrument of claim 2, wherein the composite material varies in rigidity.

4. The stringed musical instrument of claim 1, wherein the brace structure is bonded to the body of the stringed musical instrument using an epoxy material.

5. The stringed musical instrument of claim 1, further including a shim structure substantially conforming in shape to the brace structure for mounting the brace structure to the body of the stringed musical instrument.

6. The stringed musical instrument of claim 1, further including an aperture formed in the central body for securing the brace structure to the body.

7. A stringed musical instrument, comprising:

a body having a soundboard with a soundhole formed through the soundboard;

a headblock mechanically coupled to the body; and a support brace mounted to the soundboard, the support brace having a plurality of legs extending radially from a central body, the legs and central body being a unitary structure, the support brace having substantially flat upper and lower surfaces, wherein first and second legs conform to the soundhole and the central body includes notches for receiving the headblock.

8. The stringed musical instrument of claim 7, wherein the support brace is made of composite material.

9. The stringed musical instrument of claim 8, wherein the composite material varies in rigidity.

10. The stringed musical instrument of claim 7, wherein the support brace is bonded to the body of the stringed musical instrument using an epoxy material.

11. The stringed musical instrument of claim 7, further including a shim structure substantially conforming in shape to the support brace for mounting the support brace to the body of the stringed musical instrument.

12. The stringed musical instrument of claim 7, further including an aperture formed in the central body for securing the support brace to the body.

13. A stringed musical instrument, comprising:

a body having a soundboard with a soundhole formed through the soundboard; and a support brace mounted to the soundboard, the support brace having a plurality of legs extending radially from a central body, the legs and central body being a unitary structure, the support brace having substantially flat upper and lower surfaces, wherein first and second legs conform to the soundhole.

14. The stringed musical instrument of claim 13, further including:

a headblock mechanically coupled to the body;

wherein the central body includes notches for receiving the headblock.

15. The stringed musical instrument of claim 13, wherein the support brace is made of composite material.

16. The stringed musical instrument of claim 15, wherein the composite material varies in rigidity.

17. The stringed musical instrument of claim 13, wherein the support brace is bonded to the body of the stringed musical instrument using an epoxy material.

18. The stringed musical instrument of claim 13, further including a shim structure substantially conforming in shape to the support brace for mounting the support brace to the body of the stringed musical instrument.

19. The stringed musical instrument of claim 13, further including an aperture formed in the central body for securing the support brace to the body.

20. A method of manufacturing a guitar, comprising:

providing a body having a soundboard with a soundhole formed through the soundboard; and mounting a support brace to the soundboard, the support brace having a plurality of legs extending radially from a central body, the legs and central body being a unitary structure, the support brace having substantially flat upper and lower surfaces, wherein first and second legs conform to the soundhole.

21. The method of claim 20, further including:

providing a headblock; and mechanically coupling the headblock to the body, wherein the central body includes notches for receiving the headblock.

22. The method of claim 20, wherein the support brace is made of composite material.

23. The method of claim 20, wherein the composite material varies in rigidity.

24. The method of claim 20, further including forming an aperture in the central body for securing the support brace to the body.

* * * * *